United States Patent [11] 3,632,863

[72] Inventor Masayoshi Hirashima
Takatsuki, Japan
[21] Appl. No. 10,339
[22] Filed Feb. 11, 1970
[45] Patented Jan. 4, 1972
[73] Assignee Matsushita Electric Industrial Co., Ltd.
Osaka, Japan
[32] Priorities Feb. 16, 1969
[33] Japan
[31] 44/11339;
Oct. 14, 1969, Japan, No. 44/81966; Dec. 6, 1969, Japan, No. 44/98146; Dec. 6, 1969, Japan, No. 44/98147

[54] INFORMATION TRANSMITTING AND RECEIVING SYSTEM EMPLOYING AN AUDIO SUBCARRIER MODULATED BY BINARY SIGNALS
13 Claims, 40 Drawing Figs.

[52] U.S. Cl. .......... 178/5.6
[51] Int. Cl. .......... H04n 7/00
[50] Field of Search .......... 178/5.6, 50; 343/200–203; 179/2 DP, 15 BM, 15 BY

[56] References Cited

UNITED STATES PATENTS

| | | | |
|---|---|---|---|
| 3,046,329 | 7/1962 | Reesor .......... | 178/5.6 |
| 2,851,532 | 9/1958 | Crosby .......... | 179/15 BT |
| 3,099,707 | 7/1963 | Dome .......... | 178/5.6 |
| 3,160,812 | 12/1964 | Scantlin .......... | 179/15 BM |
| 3,219,759 | 11/1965 | Dome .......... | 179/15 BT |

*Primary Examiner*—Robert L. Griffin
*Assistant Examiner*—John C. Martin
*Attorney*—Stevens, Davis, Miller and Mosher ABSTRACT: A system for transmitting and receiving information in the form of television signal wave, wherein there are formed binary numbers each consisting of more than two digits which correspond to letters, symbols or pictures to be transmitted, an audio subcarrier wave is frequency-modulated with electrical signals corresponding to the signals thus produced, an audio carrier wave modulated with said subcarrier wave is transmitted together with a video carrier wave and then received and demodulated, whereby said letters, symbols or pictures are printed.

M. HIRASHIMA
INVENTOR

BY Stevens, Davis, Miller & Mosher
ATTORNEY

INFORMATION TRANSMITTING AND RECEIVING SYSTEM EMPLOYING AN AUDIO SUBCARRIER MODULATED BY BINARY SIGNALS

This invention relates to an information transmitting and receiving system.

For the transmission and reception of such information, it has heretofore been the usual practice to insert signals in horizontal or vertical blanking periods. It has also been the conventional practice that in order to transmit information by the use of an audio subcarrier wave, pictures, symbols or the like to be transmitted are converted to electrical signals at the transmitter side and such electrical signals are used to sweep an electron beam to produce an electronic photograph at the receiver side. With the prior art, therefore, relatively expensive apparatus have been required.

In the present invention, too, the transmission-reception of information is effected by using an audio subcarrier wave; however, letters, pictures or the like to be transmitted are represented in the form of binary numbers which are in turn converted to electrical signals so as to be transmitted at the transmitter side, and such electrical signals are received and demodulated so as to represent letters, pictures or the like at the receiver side.

It is an object of the present invention to provide a system for transmitting and receiving a variety of information other than conventional television signals by using television waves.

Another object of the present invention is to provide means utilizable for effecting transmission-reception of a variety of information.

Still another object of the present invention is to section signals into groups in effecting transmission and reception of a variety of information.

Other objects, features and advantages of the present invention will become apparent from the following description taken in conjunction with the accompanying drawings, in which.

Figure 7:
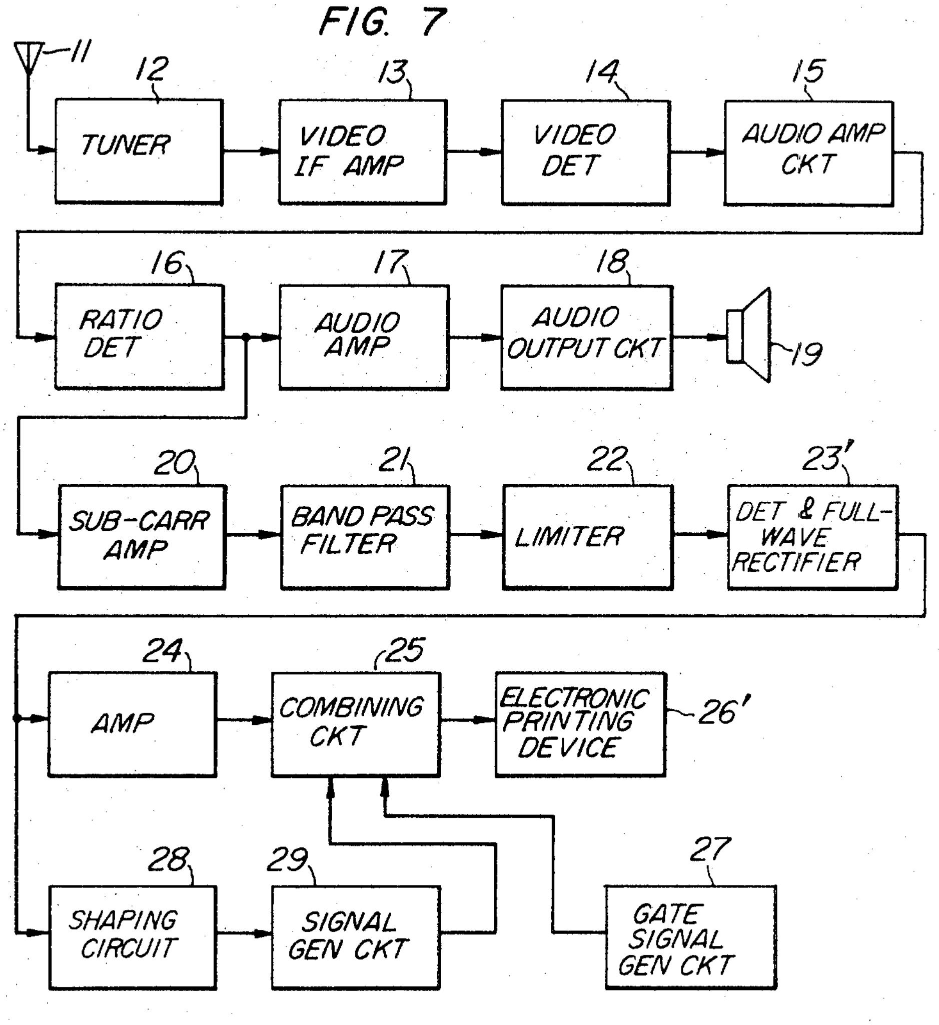
Figure 10:
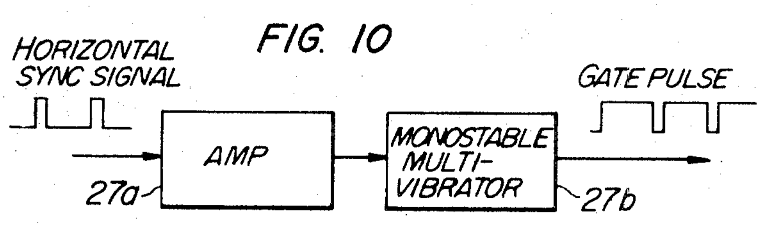
Figure 11:
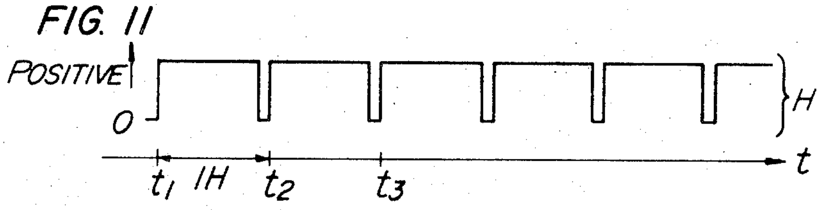
Figure 12:
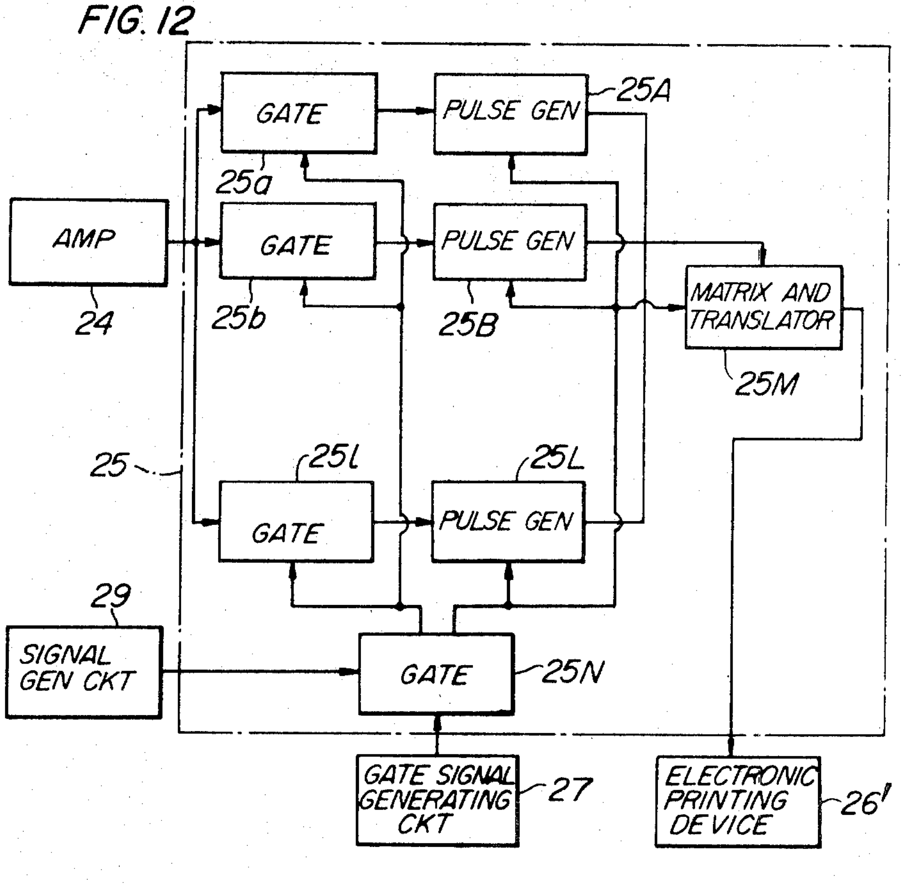
Figure 13:
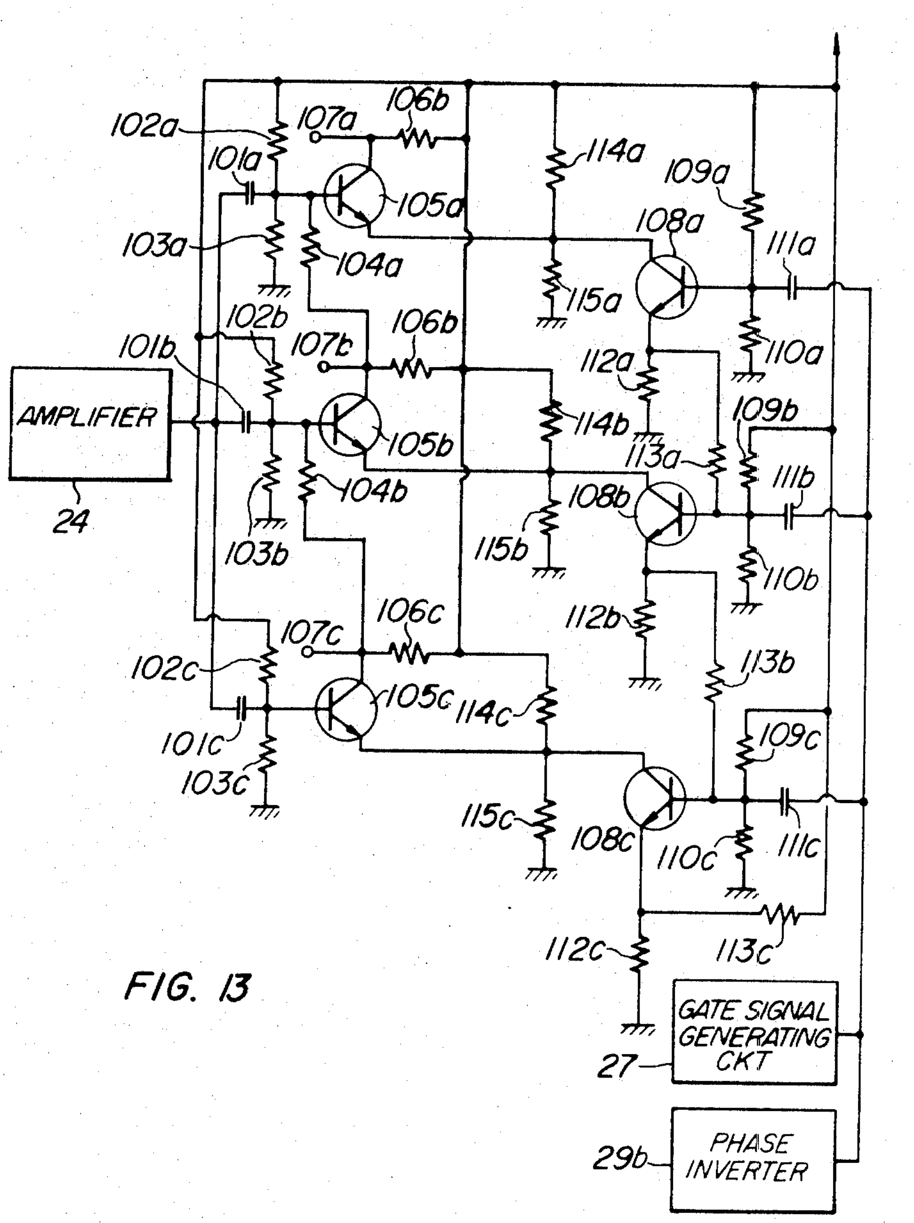
Figure 14:
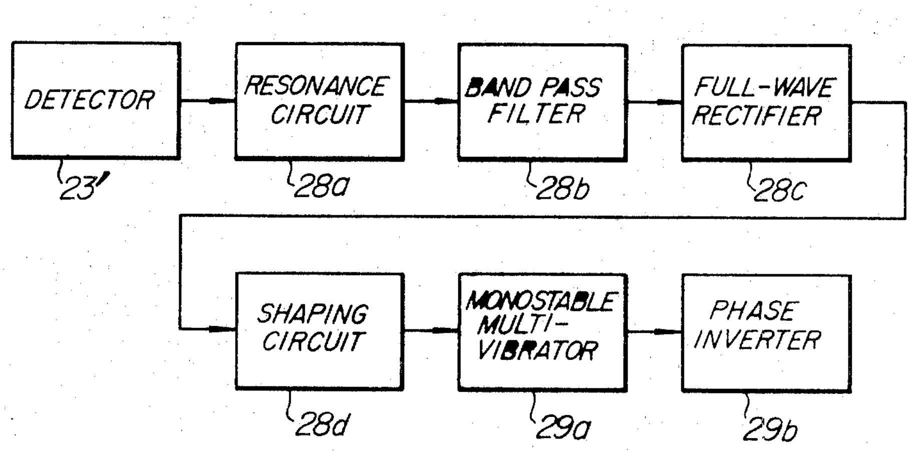
Figures 15A, 15B, 15C:
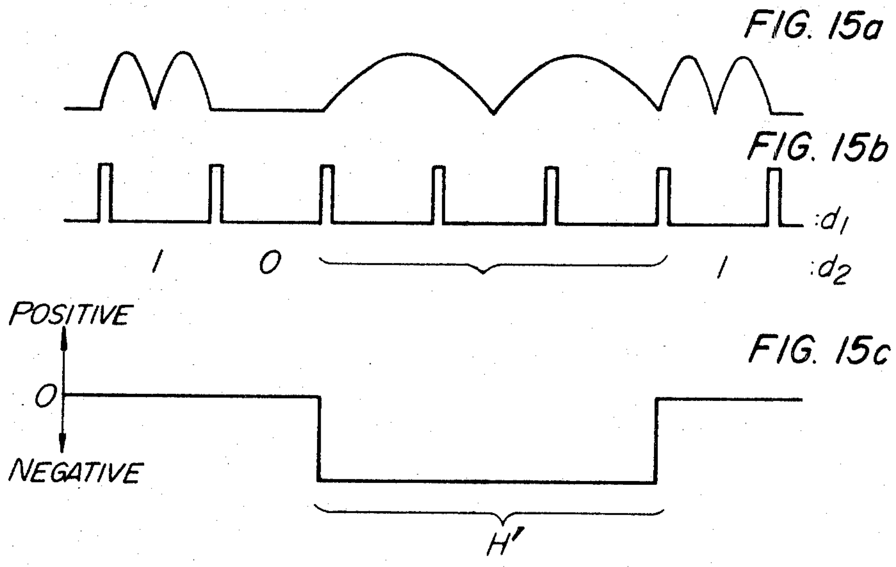
Figure 16:
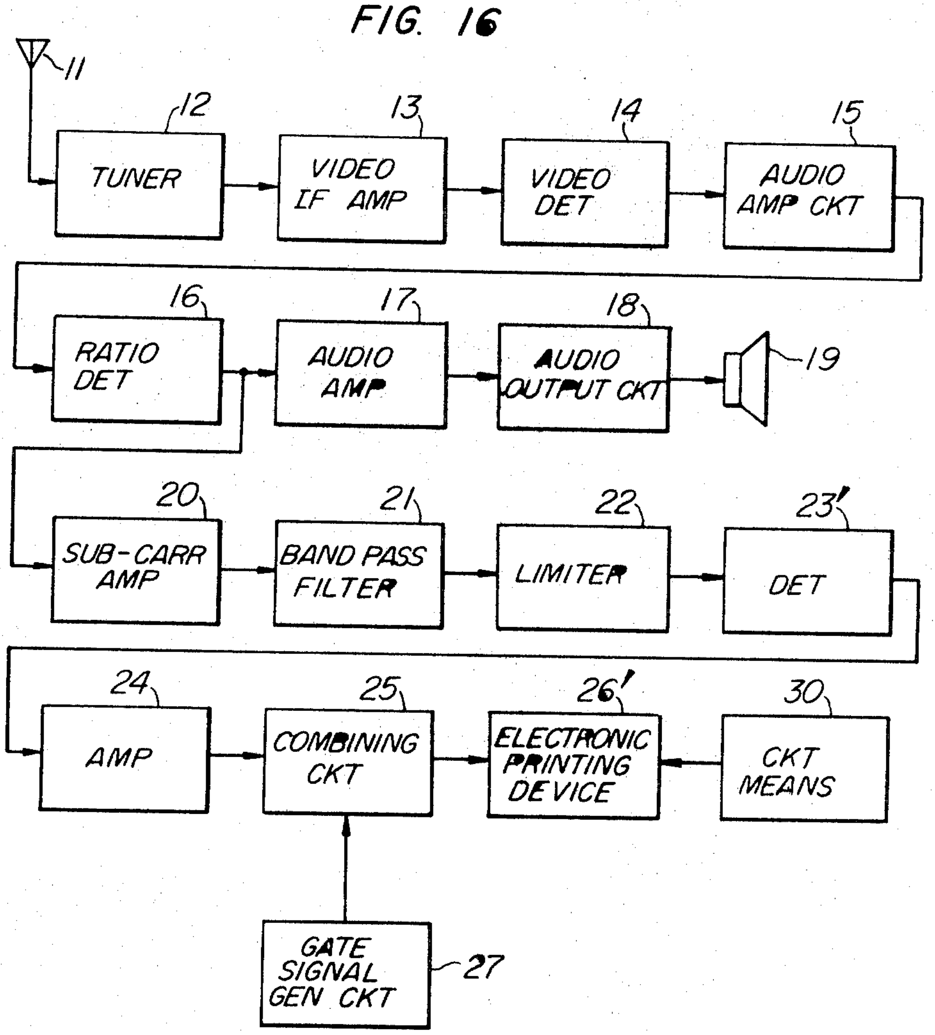
Figures 17, 18A, 18B:
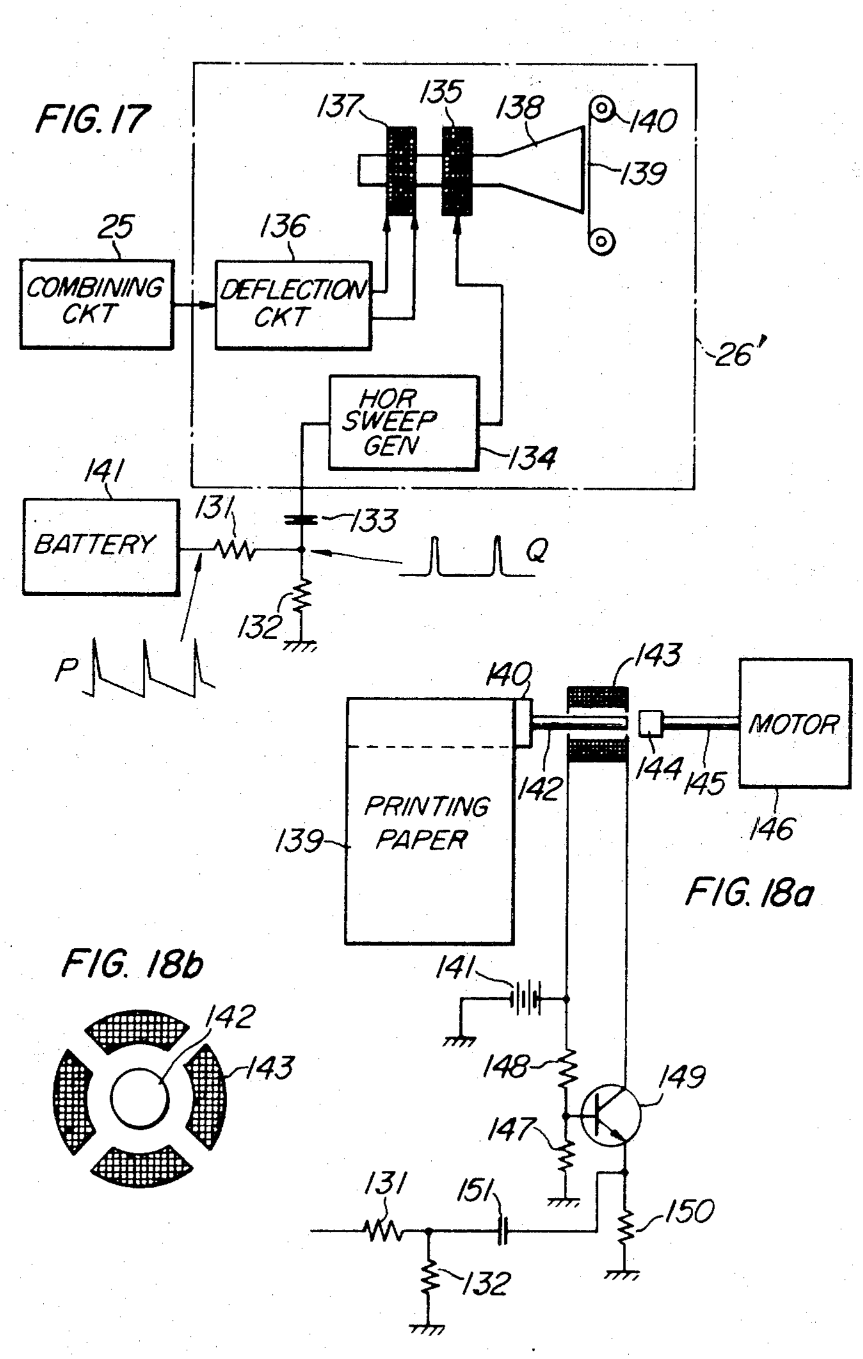
Figure 19:
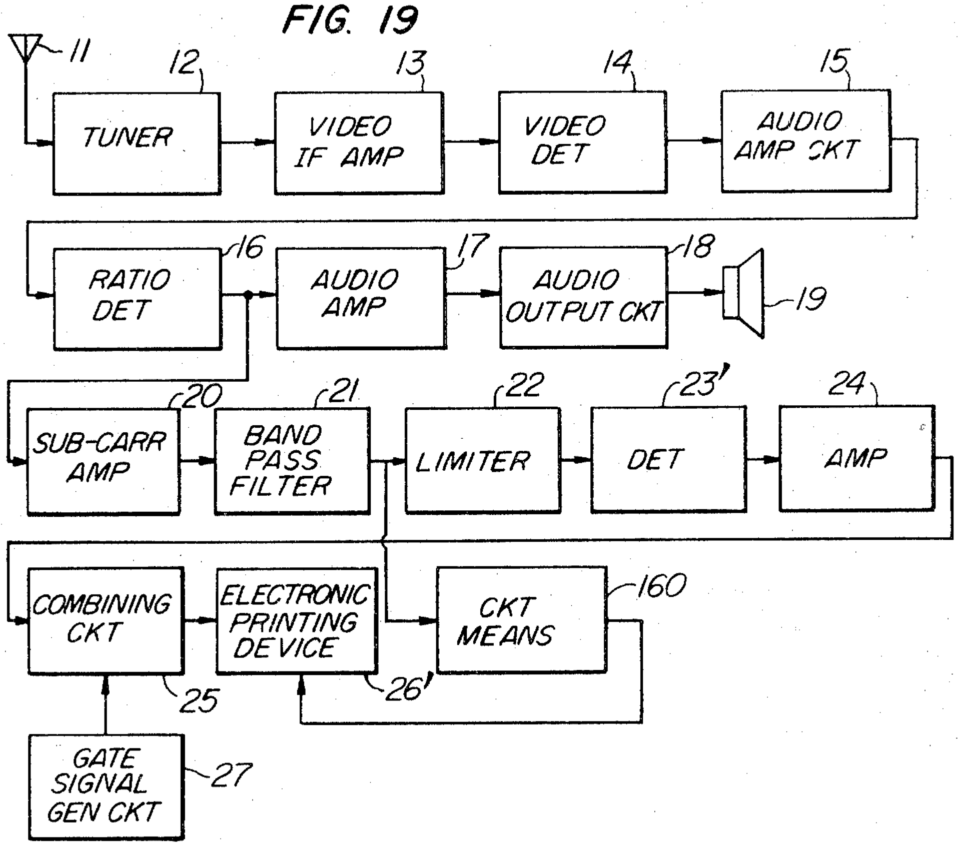
Figure 22:
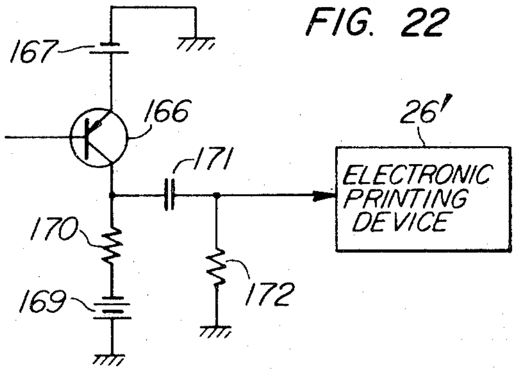
Figure 20A:
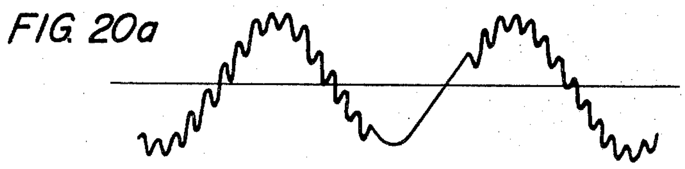
Figure 20B:
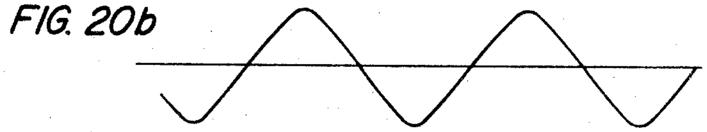
Figure 20C:
Figure 20D:
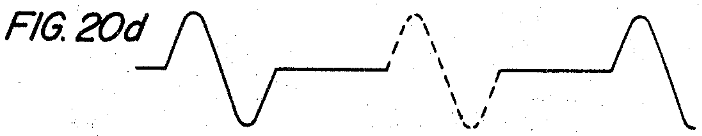
Figure 20E:
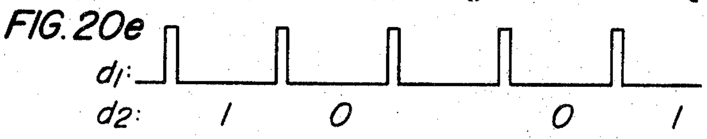
Figure 20F:
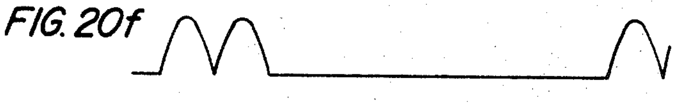
Figure 20G:
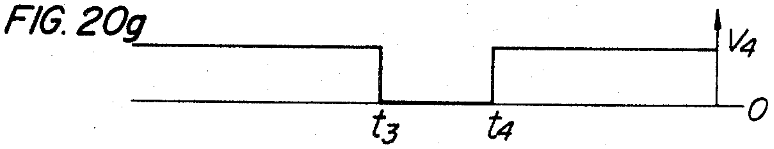
Figure 21:
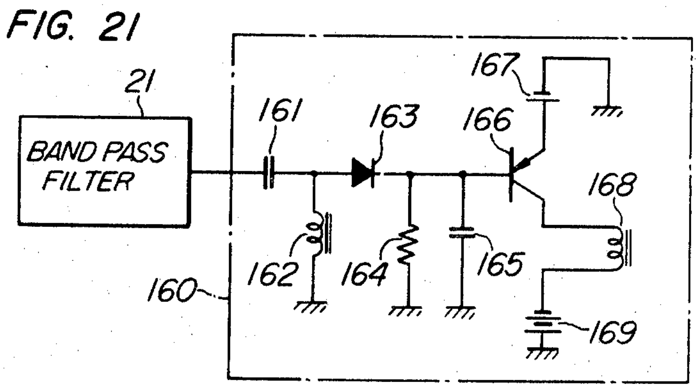

FIGS. 6*a*, 6*b*, 6*c* and 6*d* are views showing waveforms useful for explaining said transmitting and receiving apparatus respectively;

FIG. 7 is a block diagram showing the transmitting and receiving apparatus according to a second embodiment of the present invention;

FIGS. 8*a* to 8*f* and FIGS. 9*a* to 9*b* are views showing waveforms useful for explaining the apparatus shown in FIG. 7;

FIG. 10 is a block diagram showing means used in the apparatus of FIG. 7;

FIG. 11 is a view showing a waveform useful for explaining said means;

FIG. 12 is a block diagram showing the main portion of the apparatus shown in FIG. 7;

FIG. 13 is a circuit diagram showing the means used in the apparatus shown in FIG. 7;

FIG. 14 is a somewhat detailed circuit diagram of the shaping and signal generator circuits shown in FIG. 7;

FIGS. 15*a* to 15*c* are views showing waveforms useful for explaining the apparatus;

FIG. 16 is a block diagram showing the transmitting and receiving apparatus according to a third embodiment of the present invention;

FIG. 17 is a circuit diagram showing the main portion of the apparatus shown in FIG. 16;

FIGS. 18*a* and 18*b* are a circuit diagram showing the main portion of the apparatus shown in FIG. 16, respectively;

FIG. 19 is a block diagram showing the transmitting and receiving apparatus according to a fourth embodiment of the present invention;

FIGS. 20*a* to 20*g* are views showing waveforms useful for explaining said apparatus respectively; and FIGS. 21 and 22 are circuit diagram showing the main portion of the apparatus shown in FIG. 19.

It is already well known in the art to transmit two different kinds of sounds with a television audio carrier wave modulated with a separate subcarrier wave. In accordance with the present invention, information transmission is effected by translating a letter or picture into a binary number corresponding thereto, then converting the binary number into an electrical signal and modulating a subcarrier wave with the electrical signal.

Figure 1:
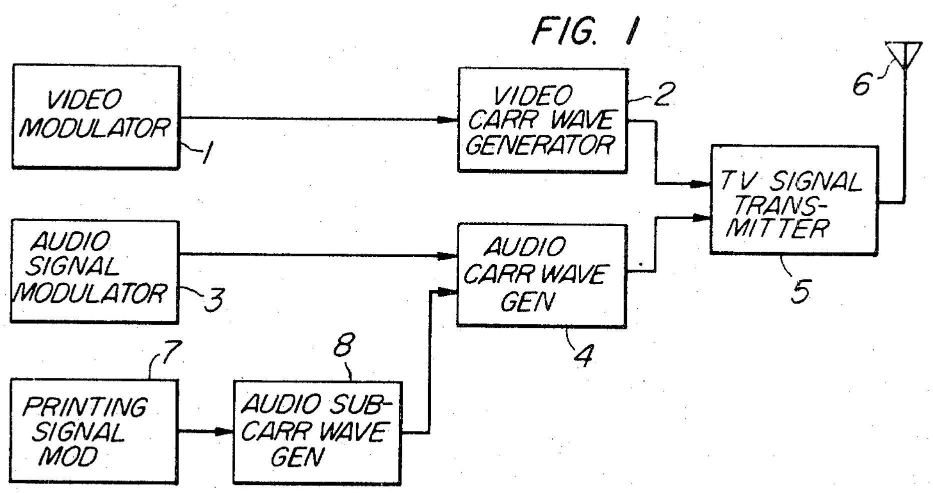
FIG. 1 is a block diagram showing a transmitter apparatus in an embodiment of the present invention.

Description will first be made of the transmission side apparatus with reference to FIG. 1. Techniques of forming a television signal and effecting multitransmission of sound by the use of a subcarrier wave are well known in the art, and therefore description thereof will be omitted. Referring to FIG. 1, numeral 1 represents a video signal modulator, 2 a video carrier wave generator, 3 an audio signal modulator, 4 an audio carrier wave generator, 5 a television signal transmitter, and 6 a transmitter antenna. The elements 1 to 6 are similar to those provided in an ordinary television transmitter system. Numeral 7 indicates a modulator for modulating an audio subcarrier wave with a signal for printing a letter to be transmitted, or printing signal, and 8 an audio subcarrier wave generator. In the case of the television transmitter-receiver system available both in the United States of America and Japan, such a subcarrier wave is assigned a frequency of 23.6 kHz. which intermediates between the horizontal synchronizing frequency of 15.75 kHz. and the first-order harmonic there of 31.5 kHz. to avoid disturbance and the subcarrier wave is frequency-modulated to improve the signal to noise ratio S/N. In the case where a subcarrier wave of 23.6 kHz. is employed, it is possible to represent each letter by a binary number consisting of several digits and transmit one such letter per second by selecting the band width to be ±6 kHz. with the maximum modulating frequency at ±6 kHz.

Figure 2:
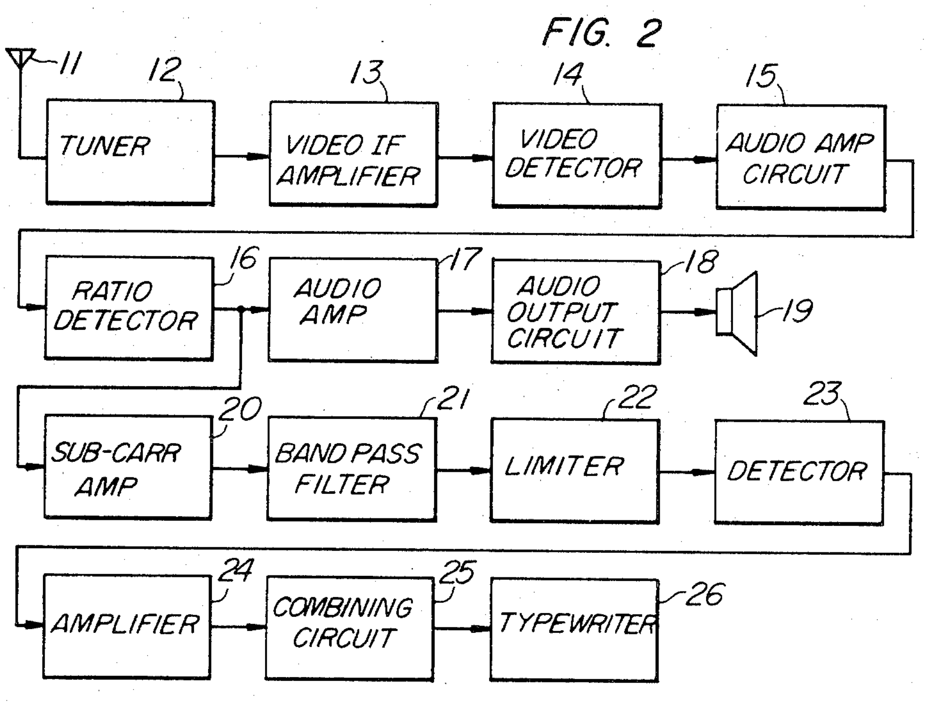
FIG. 2 is a block diagram showing the receiver apparatus in an embodiment of the present invention.

FIG. 2 is a block diagram showing the receiver arrangement embodying the present invention, wherein portions which are not related to the present invention are omitted. In FIG. 2, numeral 11 represents a receiver antenna, 12 a tuner, 13 a video intermediate-frequency amplifier circuit, 14 a video detector circuit, 15 an audio intermediate-frequency amplifier circuit, 16 a ratio detector, 17 an audio amplifier, 18 an audio output circuit, and 19 a speaker. The elements 10 to 19 constitute the signal transmission line for the audio system of the conventional television receiver. Numeral 20 indicates a subcarrier wave amplifier circuit, 21 and band-pass filter for passing only the subcarrier wave therethrough, 22 a subcarrier wave amplifier and limiter circuit, 23 a subcarrier wave detector, 24 a detection output amplifier circuit, 25 a circuit for discriminating the detection output and selecting and combining an electrical signal and a letter corresponding thereto, and 26 a typewriter.

Figure 3:
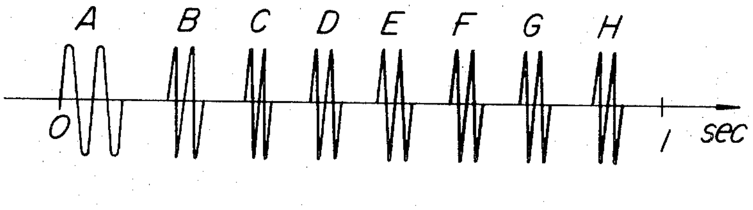
FIG. 3 is a view showing waveforms useful for explaining said apparatus.

Assume that the letters to be transmitted are those of the alphabet including the lowercase letters, uppercase letter, numbers, comma, period and so forth. Then, there are 50 different kinds of printing signals, being differentiated between the lowercase letters and the uppercase letters. Thus, on the assumption that use is made of binary numbers each consisting of six digits, it is possible to transmit 64 ($2^6=64$) different letters and symbols. By way of example, consider the case where the subcarrier wave is modulated with eight different frequencies. A frequency of 150 $H_2$ indicated at A in FIG. 3 is used as a gate signal, and the first digit or least significant digit of a binary number consisting of seven digits represented by succeeding seven signals is registered. A frequency of 300 $H_2$ indicated at B in FIG. 3 is used as a signal to discriminate between the higher and lower positions of the keys; presence of this signal indicates the higher key positions of the typewriter while absence of this signal indicates the lower key positions. It is further assumed that C to H represent binary numbers. C is 660 Hz., D 1 kHz., E 1.5 kHz., F 2 kHz., G 3 kHz., I 5 kHz. It is also assumed that presence of the frequencies C to H corresponds to "1" while absence of such frequencies corresponds to "0". That is, in the presence of C, the least significant or first digit of a six-digit binary number is "1", and if D also is present, then the second digit is also "1". If the frequencies corresponding to all the digits are present as shown in FIG. 3, then the binary number becomes 111111 which corresponds to 64 in decimal number. By transmitting such a signal as shown in FIG. 3 at every second, it is possible to transmit one signal (letter or symbol) per second.

Figure 5:
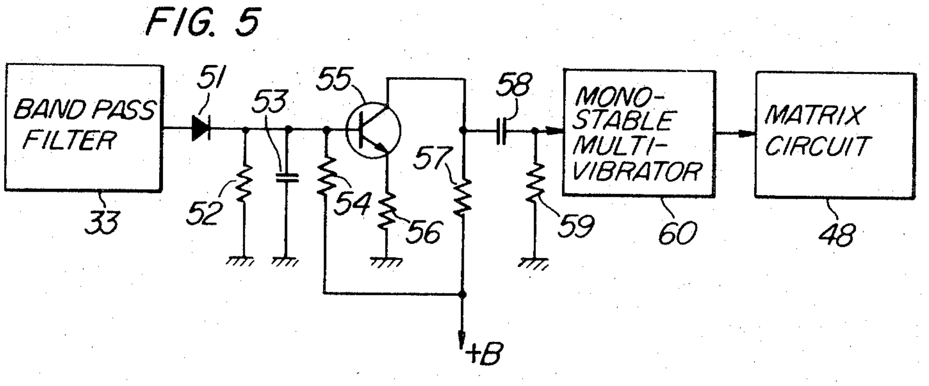
FIG. 5 is a circuit diagram of the main portion of the receiver apparatus.
Figure 6A:
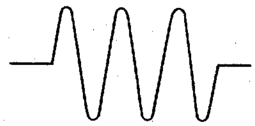
Figure 6B:
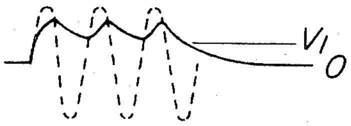
Figure 6C:
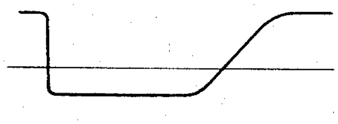
Figure 6D:
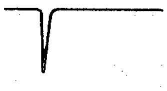
Figure 4:
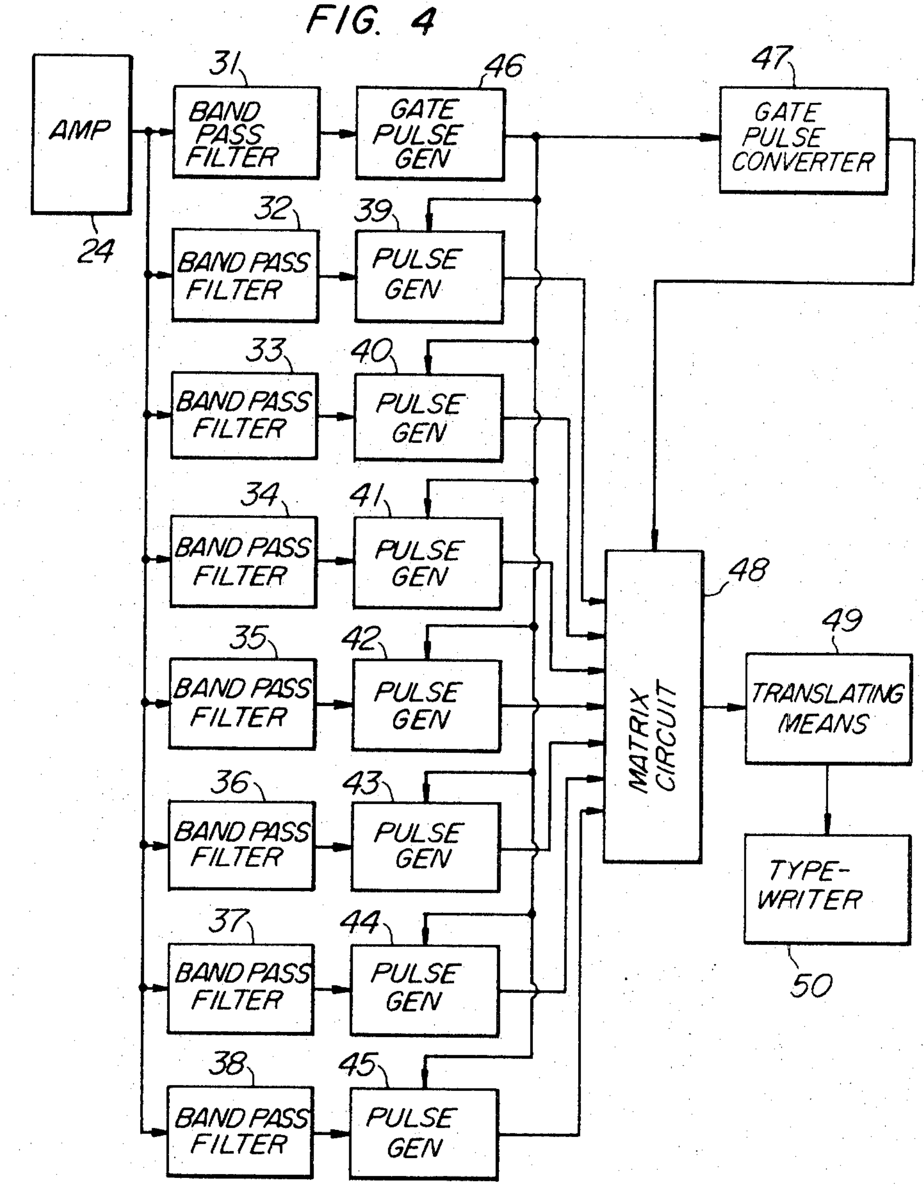
FIG. 4 is a block view showing more concretely the main portion of the said receiver apparatus.

Description will now be made of the demodulator circuit. If a ratio detector is used, a tuning transformer is required, and difficulty is encountered in securing a band width of ±5 kHz. or greater, since the frequency of the subcarrier wave is 23.6 kHz. In view of this, a counter detector is used as the detector 23 shown in FIG. 2. Waveforms resulting from the detection are as shown in FIG. 3, which are detected by means of filters provided for each frequency. FIG. 4 is a block diagram of the detector, wherein numeral 31 represents a band-pass filter for 150 Hz., 32 a band-pass filter for 300 Hz., 33 to 38 band-pass filters for the frequencies C to H respectively. Each of these filters is designed as to pass only the corresponding frequency therethrough. If the input or output of each of these filters were small then it may be amplified. Numerals 39 to 45 represent envelope detector circuits and circuits for generating pulses in accordance with the detection outputs, respectively. An example thereof is shown in FIG. 5, wherein numeral 51 represents a detector diode, 52 a detection load resistor, and 53 a capacitor for rectification. By suitably selecting the charge-discharge time constant, a waveform such as shown in FIG. 6*b* is caused to appear across the resistor 52 when the input to the diode 51 is as shown in FIG. 6*a*. The dotted waveform in FIG. 6*b* is the waveform prior to the detection. Numeral 54 indicates a resistor for superimposing a DC bias upon the detection voltage, 55 an amplifier transistor, 56 an emitter resistor, and 57 a load resistor. With this arrangement, a waveform such as shown in FIG. 6*c* appears at the collector of the transistor 55. That is, that portion of the waveform shown in FIG. 6*b* between 0 and $V_1$ is amplified and phase-reversed so that waving is eliminated. By differentiating the waveform shown in FIG. 6*c* by means of the capacitor 58 and resistor 59, the pulse shown in FIG. 6*d* is obtained. The triggering of a monostable multivibrator 60 by the pulse thus obtained results in a trigger pulse only in the presence of the output of 33 or the frequency C(660 Hz). A monostable multivibrator adapted to provide a positive-going pulse by being triggered with a negative-going pulse is well known in the art, and therefore description thereof will be omitted.

The outputs of 39 to 45 are provided to a matrix circuit 48 so as to be converted to decimal numbers. That is, if the frequency B is absent, then the output of 39 is maintained at 0, so that in that case, the first digit of the binary number becomes zero. This is also true of the other frequencies C to H. Thus, the output of the matrix circuit 48 represents a seven-digit binary number corresponding to the modulation content of the subcarrier. Numeral 49 represents means for translating such binary number to a letter of the alphabet or decimal number, and 50 a typewriter. The elements 48 to 50 can easily be realized by the technique for presently commercially available computers or the like, and therefore description thereof will be omitted. Discrimination between the upper and lower positions of the typewriter keys is effected according to whether the first digit of the seven-digit binary number is 0 or 1, and 64 or less letters or numbers are represented by the remaining six digits. Numeral 46 represents a circuit adapted to generate a gate pulse from the frequency A. This pulse makes zero all the outputs of 39 to 45, and it is imparted to a gate pulse converter 47 so as to be converted, thus making zero the output of the matrix 48. Also, this pulse clearly indicates the start and end of a seven-digit binary number.

A method of transmitting a picture by the aforementioned method will now be described wherein as in the conventional picture transmission, a picture to be transmitted is finely sectioned, and bright and dark sections thereof are made to correspond to the presence and absence of the aforementioned frequency B, that is, "0" and "1" in binary number. It is assumed that if the output of 48 is "0", this corresponds to a dark spot while if it "1" this corresponds to a white spot, for example. Respective spots of the picture to be transmitted are sequentially transmitted in a horizontal row, and then they are received and demodulated so as to be printed in the form of white and black spots. In this way, transmission of the picture can be achieved. In this case, the frequencies with which the subcarrier wave is modulated may be only two, namely A and B. The frequency A is used as a signal to indicate the starting end of the horizontal dot row, and thereafter frequency components B the number of which corresponds to the spots defined by sectioning the picture as described above may be transmitted.

By simultaneously using another subcarrier such for example as 39.4 kHz. in addition to the aforementioned frequency of 23.6 kHz., simultaneous transmission of letters and pictures can be realized.

Figure 8A:
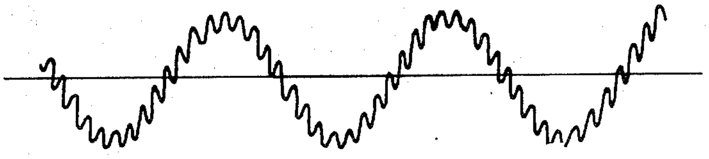
Figure 8B:
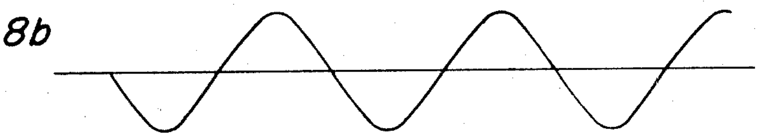
Figure 8C:
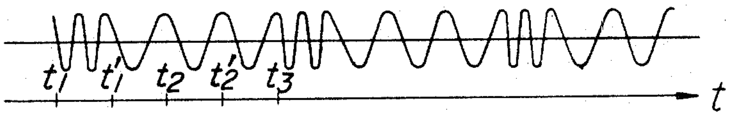
Figure 8D:
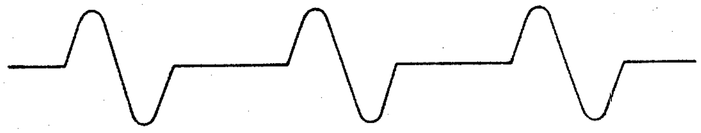
Figure 8E:
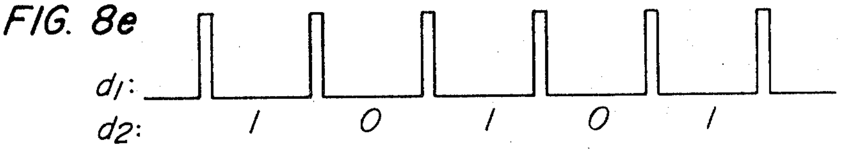
Figure 8F:
Figure 9A:
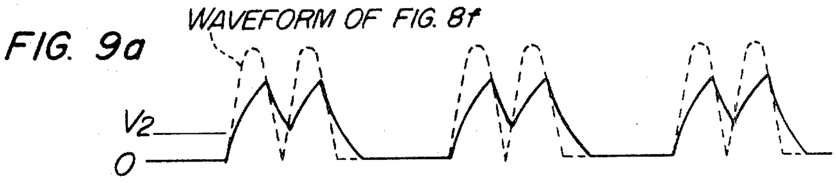
Figure 9B:
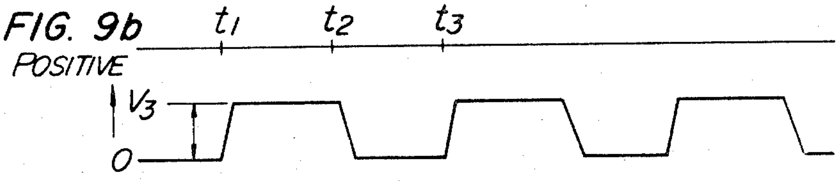

In the foregoing, description has been made of a low-speed transmission mode in which a single letter is transmitted at every second. A high-speed transmission method will be described below. Consider the case where the frequency of the subcarrier wave is selected to be 31.5 kHz. which is twice the horizontal repetition frequency of 15.75 kHz., and one-digit binary numbers are transmitted being inserted in each one horizontal repetition period. If 15 horizontal repetition periods (referred to as 1 H hereinafter) are used for each one letter, then 15,75015 =1,050/second so that 1050 letters can be transmitted at every second. The block diagram of the transmitter arrangement in this case corresponds to that of FIG. 1; however, the frequency of the subcarrier wave is changed to 31.5 kHz., and the signal with which the subcarrier wave is modulated is converted to such a type that a single sinusoidal wave is inserted in a period of 1 H. Because of the fact that the frequency of the subcarrier wave is 31.5 kHz., the frequency range in which modulation can be effected without influencing the sound is made as wide as ±15.75 kHz. Thus, the insertion of a single sinusoidal wave in a period of 1 H as described above make possible the modulation at 15.75 kHz. The receiving portion for this case is shown in FIG. 7. Elements indicated at 11 to 22 operate exactly in the same manner as those of FIG. 2, and therefore description thereof will be omitted. Numeral 25 represents a circuit adapted to discriminate the detection output and selects and combine the resulting electrical signal and letter corresponding thereto, 26' an electronic printing device, 27 a gate signal generating circuit for taking out horizontal synchronizing signals from a television receiver and amplifying them to thereby gate the circuit 25 at every 1H, 28 a shaping circuit for detecting a signal having a width corresponding to 3H in order to make registered the 0th digit of binary numbers, and 29 a circuit for generating a signal to make zero the output of 25 for the purpose of indicating the start of a 12-digit binary number. In this case, too, the subcarrier wave is frequency-modulated at the transmitter side, and such a signal as shown in FIG. 8*a* appears at the output of the ratio detector circuit 16. More specifically, the signal takes such a form that the subcarrier wave is superimposed upon the modulation content of the main audio signal. Passing through a deemphasis circuit, this signal becomes composed only of the main audio signal as shown in FIG. 8*b* which corresponds to a television audio signal, as in the foregoing cases. On the other hand, after it has been amplified in the amplifier 20 and passed through the band-pass filter 21 in FIG. 7, the signal of FIG. 8*a* becomes composed only of the subcarrier wave as shown in FIG. 8*c*. By counter-detecting this subcarrier wave, such a detection output as shown in FIG. 8*d* is obtained since the subcarrier wave is frequency-modulated. A horizontal synchronizing signal at $d_1$ in FIG. 8e, and the binary number corresponding thereto is as shown at $d_2$. By subjecting the signal thus counterdetected to full-wave rectification at a detector and full-wave rectifier 23', there is obtained such a waveform as shown in FIG. 8f. The waveform shown in FIG. 8f is imparted to the amplifier 24 to be amplified therein, and the output of the amplifier is provided to the combining circuit 25. By suitably selecting the time constant defined by the resistor and capacitor for rectification of the rectifier circuit, such a voltage waveform as shown by the full lines in FIG. 9a is obtained which is in turn amplified from 0 up to $V_2$ in an amplifier with an excellent saturation characteristic so as to be phase-reversed so that there is obtained such a pulse waveform as shown in FIG. 9b. The voltage thus obtained is applied to the circuit 25.

Horizontal synchronizing signals, which are taken out by the gate circuit 27, FIG. 7, are amplified in an amplifier circuit 27a (FIG. 10) constituting part of the gate circuit 27 so as to trigger a monostable multivibrator 27b. With the time constant suitably selected, the output of the monostable multivibrator takes such a waveform as shown at H in FIG. 11. Application of this waveform H to the circuit 25 of FIG. 12 makes conductive a gate 25a corresponding to the first digit at point of time $t_1$. At this point, if the output of the amplifier circuit 24 is a constant voltage such as $V_3$ in FIG. 9 for example, then a pulse generator circuit 25A is made to provide a signal representing "1". In the same manner, gates 25b, 25c, ..... are sequentially rendered conductive at points of time $t_2$, $t_3$, ..... respectively so that pulse generator circuits 25B, 25C, ..... are sequentially made to provide a signal representing "1" or "0". These outputs of these circuits 25A to 25L are converted from binary numbers to letters corresponding thereto in a matrix and translator circuit 25M so as to be printed at 26'. In order that the aforementioned operation can be positively performed, 25N serves to prevent the gate pulse H from being imparted to 25a to 25l during a period of 3H immediately subsequent to the aforementioned 12-digit binary number. 25N is so designed as to be rendered operative only when the output of 28 is one.

Supplementing the above explanation, the signal of FIG. 8c is nonmodulated which has a frequency of 31.5 kHz.+15.75 kHz. between $t_1$ and $t_1'$, 31.5 kHz.–15.75 kHz. between $t_1'$ and $t_2$ and 31.5 kHz. between $t_2$ and $t_2'$ and $t_2'$ and $t_3$. With the polarity of the counterdetection suitably selected, a positive voltage is produced when the subcarrier wave is modulated to a higher frequency whereas a negative voltage is produced when modulated to a lower frequency, as shown in FIG. 8d.

It is well known to make the gates 25a to 25l of FIG. 12 conductive only for a period corresponding to each digit by imparting successive gate pulses to these gates. An example will be described below. In FIG. 13, 101a to 101c indicate capacitors. Output 9b (FIG. 9) of the amplifier 24 is imparted to transistors 105a to 105c. 102a to 102b and 103a to 103c represent resistors for determining the base bias voltages to be applied to the transistors 105a to 105c respectively. 106a to 106c indicated load resistors, and 107a to 107c gate output terminals which are connected to 25A to 25C respectively. 108a to 108c denote switching transistors, 109a to 109c and 110a to 110c resistors for providing base bias, 111a to 111c capacitors through which output H of the circuit 27 is passed to the transistors 108a to 108c, 112a to 112c emitter resistors, and 113c resistor for providing a bias to bring the transistor 108c into the cut off state. First of all, consider the case where there is no gate pulse. In such a case, the transistor 108c is in the nonconducting state. The remaining transistors 108a and 108b are also rendered nonconductive. The resistors 109a to 109c and 110a to 110c are so selected that only the transistor 108a is rendered conductive upon the arrival of a gate pulse. By rendering the transistor 108a conductive first, an emitter current is caused to flow therethrough so that a voltage is developed across the emitter resistor 112a. This voltage is applied to the base of the transistor 108b through the resistor 113a so as to be stored at a capacitor 116b, so that the base voltage builds up. The time constant is so selected that the transistor is rendered substantially conductive in a period exactly corresponding to one horizontal period. When a second pulse arrives, the base potential of the transistor 108b becomes higher than the emitter potential thereof so that this transistor conducts. When the transistor 108a is rendered conductive by the first gate pulse, a collector current is made to flow therethrough so that the collector voltage of the transistor 108a is decreased. The collector of the transistor 108a is connected to the emitter of the transistor 105a. The design is made such that a voltage higher than base voltage is imparted to the emitter of the transistor 105a with the aid of resistors 114a and 115a when the transistor 108a is rendered nonconductive. Thus, when the emitter voltage of the transistor 105a becomes lower than the base voltage thereof as a result of conduction of the transistor 108a, the transistor 105a is rendered conductive so that the output of the amplifier 24 is phase-reversed and passed to the circuit 25A via the terminal 107a. Subsequently, when the transistor 108b is rendered conductive by the second gate pulse, a collector current flows through the resistor 114 b, so that the collector voltage of the transistor 108b is decreased so that the emitter voltage of the transistor 105b is also decreased. Further, the design is made such that a voltage higher than the base voltage is applied to the emitter of the transistor 105b with the aid of resistors 114b and 115b when the transistor 108b is in the nonconducting state. Thus, when the transistor 108b conducts and the emitter voltage of the transistor 105b becomes lower than the base voltage thereof, the transistor 105b is rendered conductive so that collector current of the transistor 105b flows through the resistor 106b, with a result that the collector voltage is dropped. This voltage drop is transmitted to the base of the transistor 105a through resistor 104a. Consequently, the base voltage of the transistor 105a becomes lower than the emitter voltage thereof, so that this transistor again becomes nonconductive. In this way, the transistor 105a conducts only for a period corresponding to the first one of gate pulses imparted thereto. When the transistor 105b conducts, the output of the amplifier 24 is subjected to phase-reversal and passed to the circuit 25B via the terminal 107b. Furthermore, a voltage which is developed across the resistors 112b by the emitter current of the transistor 108b is applied to the transistor 108c through the resistor 113b. The time constant is so selected that the transistor 108c is rendered substantially conductive in a period corresponding to one horizontal period (1H), as was the case with the transistor 108b. Upon arrival of a third gate pulse, the base voltage of the transistor 108c becomes higher than the emitter voltage thereof so that this transistor conducts. In the same manner as has been described with respect to the transistors 108b and 105b, the transistor 105c is rendered conductive while the transistor 105b is rendered nonconductive which is made to conduct only for a period corresponding to the second gate pulse. The transistors and circuit element may be increased in number up to l. The use of l (say 12) gates makes it possible to handle 12-digit binary numbers. A signal modulated with a frequency of 15.75/3=5.25 kHz. is inserted in a period of 3H subsequent to each "0" or "1" signal corresponding to the 12th digit; part of the output waveform FIG. 15a of 23' in FIG. 14 is taken out to be imparted to a 5.25 kHz. resonance circuit 28a and then passed through a 5.25 kHz. band-pass filter 28b; 28a and 28b prevent the component of 15.75 kHz. And, the output of 28b is full-wave rectified by 28c, the output of which is in turn waveshaped, amplified and differentiated by 28d, and will trigger a monostable multivibrator 29a so that negative-going gate pulses each having a width of 2 to 3H only when said 5.25 kHz. signal is supplied thereto. The element 29a is a monostable multivibrator of which the output pulse width is selected in a range of 2 to 3H. The output of the monostable multivibrator 29a is converted only in respect of phase by 29b so that negative-going pulse H' in FIG. 15c is obtained. By applying this output pulse H' to the transistors 108a to 108c of FIG. 13, the transistor 108a is rendered nonconductive so that the transistor 105a is rendered nonconductive. At this time, the transistors 108b and 108c are also rendered nonconductive so that the transistors 105b and 105c are also rendered nonconductive. Since the width of the negative-going pulse is made as wide as 2 to 3H, the voltages which have been charged at the capacitors 111b and 111c are also discharged. And yet, since no emitter current flows through the transistors 108a and 108b during this discharge, the base voltages of the transistors 108b and 108c depend upon the resistors 109b, 110b and 109c, 110c respectively. Thus, the circuit arrangement is returned to the initial state and waits for arrival of a gate pulse available from the gate pulse generator 27, and the gates 25a, 25b, ....., 25l are successively opened by the next gate pulses available from the gate pulse generator 27.

It is possible to achieve transmission and reception of 1,050 words (or symbols) by representing a single letter or symbol by inserting a signal corresponding to "0" or "1" in one horizontal period (1H) and representing single letters or symbols by the use of 15H or binary numbers of 12H (12 digits) and auxiliary signal having a width of 3H as described above. Since $2^{12}$=4096, it is possible to indicate more than 1,000 kinds of symbols such as Chinese characters, numerals, letters, of the alphabet, Japanese Kava characters and so forth, and thus it will be seen that almost all letters and symbols for daily use can be represented by the use of 12-digit binary numbers.

With the foregoing method, however, there is contained no signal to control the signal rows corresponding to a letter or picture. Description will now be made of a method to determine such rows by utilizing vertical synchronizing signals. FIG. 16 is a block diagram showing an example of the arrangement to carry out such a method. In this Figure, other elements than that indicated at 30 are similar to those of FIG. 7, and therefore description thereof will be omitted. Applied to the circuit means 30 are either vertical synchronizing signals taken out of synchronizing signals occurring in a television receiver or pulses which are in synchronism with vertical synchronizing signals available from the vertical oscillation output circuit while vertical synchronization are achieved. The details of the circuit 30 is shown in FIG. 17, wherein numerals 131 and 132 represent resistors which are adapted to divide a pulse voltage (*p*) occurring at the plate of a vertical output tube 141 and pulses are imparted as trigger pulses to the sweep circuit of a printer 26' through a capacitor 133. In FIG. 2, such a printer was assumed to be a typewriter; however, such a typewriter cannot follow in such cases that one signal is to be transmitted within each one horizontal scanning period (1H). Thus, use is made of an electronic printer. In FIG. 17, numeral 134 represent a circuit for providing a voltage waveform to horizontally sweep an electron beam of a cathode-ray tube 138 at the vertical scanning repetition period by a deflection coil 135. This circuit 134 is triggered by the trigger pulses Q, the starting point of the horizontal trigger being always in registry with the vertical synchronization. As the circuit for sweeping the electron beam in the vertical synchronization, use may be made of the vertical deflection circuit of an ordinary television receiver. For the sake of simplicity, consider the case where numerals only are to be printed. Numeral 136 represents a circuit for providing horizontal and vertical deflection currents to form Arabic numerals by vertical and lateral combinations of electron beams. By imparting such currents to the deflection coil 137, any desired Arabic numerals can be displayed on the screen of the cathode ray tube of the electron beam. Such a technique has heretofore found extensive use in the field of measuring instruments, and therefore description thereof will be omitted. The deflection coil 135 forms a high-caliber electromagnetic lens and which is adapted to horizontally sweep the entire electron beams so deflected as to decide numerals by the deflection coil 137. Numeral 139 indicates a high-sensitivity printing paper which is sensitized by a numeral displayed on the cathode-ray tube screen and thus printed. This printing paper may be upwardly fed line by line at every vertical synchronizing period by means of a takeup roll. Alternatively, the beam may be downwardly shifted line by line at every vertical synchronizing period by deflecting it upwardly and horizontally by means of a coil which is provided in the deflection coil 135 for the purpose of effecting vertical deflection of the electron beam. An example of the arrangement using a roll is shown in FIG. 18a, wherein numeral 140 iron roll, numeral 142 iron roll shaft, 143 an electromagnet, 144 a permanent magnet, 145 a motor shaft, 146 a motor, 147 and 148 resistors for imparting a bias to the base of a transistor 149, and 150 an emitter resistor. The base bias of the transistor 149 is so selected that this transistor is rendered nonconductive only when the trigger pulse Q shown in FIG. 17 is imparted to the emitter thereof through a capacitor 151. By arranging the electromagnet 143 and permanent magnet 144 so that they repel each other, a collector current is caused to flow through the electromagnet 143 when the transistor 149 is in the conducting state, whereby magnets 143 and 144 are caused to repel each other so that the permanent magnet 144 is spaced apart from the shaft 142. The permanent magnet 144 is brought into contact with the shaft 142 due to the magnetic force thereof with such a design that when the trigger pulse is imparted to the emitter of the transistor 149, the latter is rendered nonconductive to stop the current flow through the electromagnet 143 so that the repulsion of the magnets 143 and 144 is eliminated so as to permit the motor shaft 145 to be horizontally displaced. Thus, during the time of application of trigger pulses to the transistor, the motor shaft 142 and electromagnet 144 are maintained in contact with each other so that the rotation of the motor is transmitted to the takeup roll. By suitably selecting the rotation force of the motor, it is possible to bring the electromagnet 144 into contact with the shaft 142 so as to achieve an angle of rotation corresponding to one line of the printing paper. In the case where the electromagnet 144 and motor shaft 142 are coupled directly to each other, a reduction gear means may be provided therebetween if rotation greater than that corresponding to one line occurs. As will be seen from the foregoing, it is possible to make the start of each line register with a vertical synchronizing signal and effect recording with the paper shifted by one line at every vertical synchronizing period. The electromagnet 143 which consists of four relationship between the electromagnets and the motor shaft 142 is such that the latter is located at the center of the former and maintained at such a center position where the balance of magnetic forces occur, even when the electromagnet 143 is energized. Numeral 141 represents a battery, and 151 a coupling capacitor.

Description will now be made of an example wherein an amplitude-modulated signal is used as the line changing signal at the same time. At the transmitter side, it is possible to effect a sort of amplitude modulation with amplitude modulation degrees of 100 and 0 percent by making intermittent the subcarrier output of 8 in FIG. 1. Portions with the amplitude modulation degree of 0 percent are modulated with electrical signals corresponding to binary numbers as described above, and portions with the amplitude modulation degree of 100 percent are inserted to thereby indicate line change. FIG. 19 is a block diagram of the receiver arrangement. In this Figure, other elements than that indicated at 160 are similar to the elements 11 to 27 in FIG. 16. By applying the output of 21 in FIG. 19 to the circuit means 160 and rectifying the subcarrier wave therein, there are obtained such an output waveform as shown in FIG. 20g. During the period of time $t_3$–$t_4$ when the subcarrier wave is 100 percent amplitude-modulated, the output voltage becomes zero as will be seen from the output waveform shown in FIG. 20g, and output voltage obtained by detecting the subcarrier wave is maintained substantially at a positive constant value $V_4$ during the time when the amplitude modulation degree of the subcarrier wave is zero. More strictly speaking, since the subcarrier is frequency-modulated, the detection voltage becomes higher than $V_4$ when the subcarrier wave is shifted toward higher frequencies, whereas it becomes lower when the subcarrier wave is shifted toward lower frequencies. The circuit 160 is constructed as shown in FIG. 21 wherein the output of 21 is imparted to a circuit consisting of a capacitor 161 and inductance 162 which is resonating at the subcarrier wave frequency, positive-polarity detection is effected by a diode 163 and the detection output is smoothed out by a load resistor 164 and charge-discharge capacitor 165. With such a circuit arrangement, a positive voltage is applied to the base of a transistor 166 except the time interval $t_3$–$t_4$. By making the potential of a battery 167 lower than $V_4$, the transistor 166 is rendered nonconductive except between $t_3$ and $t_4$. If the base voltage becomes zero during the period of time $t_3$–$t_4$, then the transistor 166 is rendered conductive so that a collector current thereof is caused to flow into a power source 169 through a relay. Line change in the printer 26′ may be effected by the operation of the relay 168. In an attempt to mechanically effect the line change by means of the relay, however, it is impossible to increase the line-changing speed. Therefore, a resistor 170 may be inserted at the collector side of the transistor 166 instead of the relay 168 as shown in FIG. 22, wherein a voltage developed thereacross is differentiated by a capacitor 171 and resistor 172 to generate a trigger pulse to thereby trigger such a printer as shown at 26′ in FIG. 17, thus effecting line change while performing the printing operation. In case 100 percent amplitude modulation occurs when the subcarrier transmission is interrupted or while the subcarrier wave is being transmitted, the detection output of 163 in FIG. 21 becomes zero, and line change can be effected by operating the printing mechanism of the printer by using the switching operation of the transistor 166.

In accordance with the present invention, an audio subcarrier wave modulated with a binary number corresponding to a letter or symbol is superimposed upon a television wave, so that signal transmission and reception can be effected by partly modifying conventional television receivers. Furthermore, the intended purposes can be achieved with a very inexpensive apparatus by directly driving a typewriter with the transmission-reception being effected at a low speed.

I claim:

1. An information transmitting and receiving system for communicating information in the form of a television signal wave comprising:

transmission apparatus including means for modulating an audio subcarrier wave within a predetermined period with an electrical signal representing an "$n$"-digit binary number which corresponds to a letter, symbol or picture to be transmitted, and means for transmitting the modulated audio subcarrier as a television signal;

and a receiver for receiving the transmitted signal, wherein said receiver includes;

a band-pass filter for passing only an audio subcarrier wave therethrough, a detector circuit for detecting the audio subcarrier being passed through said band-pass filter, a plurality of filter circuits connected to receive the output from said detector circuit, each of said plurality of filter circuits being capable of passing only an output corresponding to a predetermined digit of said "$n$"-digit binary number, a plurality of pulse generators connected to said plurality of filter circuits to receive the outputs thereof so as to produce a pulse upon receiving the output from said pulse generator, a matrix circuit for converting a received pulse generator output into binary numbers, and means for recording the output from said matrix circuit as a letter, symbol or picture.

2. An information transmitting and receiving system according to claim 1, wherein said transmission apparatus comprises modulating means for modulating the audio subcarrier wave with "$n$" kinds of different frequencies corresponding to an "$n$"-digit binary number, and said plurality of filter circuits in the receiver comprises band-pass filters (32–38) corresponding to said "$n$" different frequencies for passing only an output corresponding to a predetermined digit of said "$n$"-digit binary number.

3. An information transmitting and receiving system according to claim 2, wherein said modulating means (7) in the transmission apparatus modulates the audio subcarrier wave with "$n$" kinds of different frequencies and a further added gate signal having a different frequency from the "$n$" different frequencies, and said receiver further comprises a band-pass filter (31) for passing the frequency of said gate signal, and a gate pulse generator (46) for producing a pulse upon receiving an output from said band-pass filter (31), said output of the gate pulse generator (46) making zero the outputs of said plurality of pulse generators (39–45) and said matrix circuit (48).

4. An information transmitting and receiving system according to claim 1, wherein said means (7) for modulating an audio subcarrier wave in the transmission apparatus modulates the audio subcarrier wave with one kind of frequency in every certain period, and in the receiver said plurality of circuits for passing only an output corresponding to a predetermined digit of said "$n$"-digit binary number includes a plurality of gates (25*a*–25*l*) and means (27) for making said plurality of gates conductive at every certain period one after another.

5. An information transmitting and receiving system according to claim 4, wherein a gate frequency of a different frequency is further added besides the signal of said one kind of frequency which modulates an audio subcarrier, and the gate frequency is inserted after the "$n$"-digit binary number, and said receiver includes means (28,29) for picking up the gate frequency from the output of said detector circuit (23′) and for making zero the outputs of said plurality of pulse generators and said matrix circuit.

6. An information transmitting and receiving system according to claim 4, wherein said means (26,26′) for recording the output from the matrix circuit (48) includes means for moving the output of the matrix circuit horizontally and also line by line vertically on the screen of a cathode-ray tube (138) with a vertical synchronizing signal by applying the output of the matrix circuit (48) to a deflection circuit (135, (137) of the cathode-ray tube (138).

7. An information transmitting and receiving system according to claim 4, wherein said means (26,26′) for recording the output from the matrix circuit (48) includes a cathode-ray tube (138) and a printing paper (139) placed on the face of the screen of the cathode-ray tube and the output from the matrix circuit (48) is moved horizontally on the cathode-ray tube screen with a vertical synchronizing signal by applying the output of the matrix circuit to a deflection circuit (135,137) and on the other hand the printing paper is rendered to move vertically line by line with a vertical synchronizing signal by means of a takeup roll (140).

8. An information transmitting and receiving system according to claim 7, wherein the end of an iron roll shaft (142) of said printing paper takeup roll (140) protrudes in a coil forming an electromagnet (143) and a motor shaft (145) of a driving motor (146) having a permanent magnet (144) attached at the end of the motor shaft (145) is positioned engageably with the roll shaft (142) by controlling the energization of the electromagnet (143), and wherein the electromagnet (143) is deenergized only during such period when the vertical synchronizing pulse exists thereby accomplishing the mechanical coupling between the roll shaft (142) and motor shaft (145).

9. An information transmitting and receiving system according to claim 4, wherein besides a single signal for modulating the audio subcarrier wave a gate signal consisting of the audio subcarrier wave having intermittent periods is further added, and in the receiver means (160) for detecting the intermittent periods of the audio subcarrier wave and making zero the outputs of said plurality of pulse generator and said matrix circuit by applying the detected signal thereto is further provided.

10. A receiver for receiving information in the form of television signal wave, wherein the signal if formed by modulating an audio subcarrier wave with "*n*" kinds of different frequencies corresponding to an "*n*"-digit binary number, said receiver comprising:

a band-pass filter for passing only an audio subcarrier wave therethrough, a detector circuit for detecting the audio subcarrier being passed through said band-pass filter, "*n*" different filter circuits (32–38) connected to receive the output from said detector circuit, said filter circuits corresponding to said "*n*" different frequencies respectively, "*n*" different pulse (39–45) connected to said "*n*" different filter circuits so as to produce a pulse upon receiving the outputs from said pulse generators, a matrix circuit (48) for converting a received pulse generator output into binary numbers, and means for recording (49,50) the output from said matrix circuit as a letter, symbol or picture.

11. A receiver for receiving information in the form of television signal wave, wherein said signal if formed by modulating an audio subcarrier wave with "*n*" kinds of different frequencies corresponding to an "*n*"-digit binary number and a gate frequency, said gate frequency being different from said "*n*" different frequencies, said receiver comprising:

a band-pass filter for passing an audio subcarrier wave therethrough, a detector circuit for detecting the audio subcarrier being passed through said band-pass filter, "*n*+1" different filter circuits connected to receive the output from said detector circuit, said "*n*+1" filter circuits corresponding to said "*n*" different frequencies and one gate frequency respectively, "*n*+1" different pulse generators connected to said "*n*+1" different filter circuits so as to produce a pulse upon receiving the outputs from said pulse generators, a matrix circuit for converting output pulses from "*n*" different pulse generators corresponding to said "*n*" different frequencies into binary numbers, means for recording the output from said matrix circuit as a letter, symbol or picture, and means for making zero the outputs of said "*n*" different pulse generators and said matrix circuit upon receiving a pulse from one remaining pulse generator corresponding to said gate frequency.

12. A receiver for receiving information in the form of a television signal wave, wherein said signal is formed by modulating an audio subcarrier wave with one kind of frequency in every certain period and formed as a whole "*n*" digit binary number, said receiver comprising:

a band-pass filter for passing only an audio subcarrier wave therethrough, a detector circuit for detecting the audio subcarrier being passed through said band-pass filter, "*n*" different gate circuits connected to receive the output from said detector circuit for passing said "*n*" digit binary number, means for making said gate circuits conductive at every certain period one after another, "*n*" different pulse generators connected to receive the outputs of said gate circuits for generating a pulse upon receiving the outputs from said gate circuits, a matrix circuit for converting a received pulse generator output into binary numbers, and means for recording the output from said matrix circuit as a letter, symbol or picture.

13. A receiver for receiving information in the form of a television signal wave, wherein said signal is formed by modulating an audio subcarrier wave with one kind of frequency in every certain period and formed to contain as a whole "*n*" digit binary number and one gate signal, said receiver comprising:

a band-pass filter for passing an audio subcarrier wave therethrough, a detector circuit for detecting the audio subcarrier being passed through said band-pass filter, "*n*+1" different gate circuits connected to receive the output from said detector circuit for passing said "*n*" digit binary number and said gate signal, means for making said gate circuit conductive at every certain period one after another, "*n*+1" different pulse generators connected to receive the outputs of said gate circuits for generating a pulse upon receiving the outputs from said gate circuits, a matrix circuit for converting a received pulse generator output into binary numbers, means for recording the output from said matrix circuit as a letter, symbol or picture, and means for making zero the output of said "*n*" different pulse generators and said matrix circuit upon receiving a pulse from one remaining pulse generator corresponding to said gate signal.

* * * * *